United States Patent [19]

Deters

[11] Patent Number: 4,520,759
[45] Date of Patent: Jun. 4, 1985

[54] WASTE FLUSHING UNIT FOR HOG FARROWING

[76] Inventor: Thomas J. Deters, Rte. 1, Box 84, Sigel, Ill. 62462

[21] Appl. No.: 573,029

[22] Filed: Jan. 20, 1984

[51] Int. Cl.³ .............................................. A01K 1/01
[52] U.S. Cl. ................................................... 119/28
[58] Field of Search .............. 119/28, 16, 20; 52/633, 52/660; 210/163

[56] References Cited

U.S. PATENT DOCUMENTS

| 63,284 | 3/1867 | Miller | 210/163 |
| 469,044 | 2/1892 | Jungbluth | 119/28 |
| 3,982,499 | 9/1976 | Frankl | 119/28 |
| 4,402,282 | 9/1983 | Steidinger | 119/28 |

Primary Examiner—Hugh R. Chamblee
Attorney, Agent, or Firm—Berman, Aisenberg & Platt

[57] ABSTRACT

A gutter system is disclosed for use in raising animals. The system includes a plurality of channels for carrying animal waste. Enclosures are mounted above the gutter system and a waste-permeable floor is provided to allow waste from the animals to pass into the channel. A gutter unit includes walls for supporting the floor which are chamfered to prevent accumulation of waste between the supporting walls and the floor. Sidewalls support the animal enclosure and have slots which open outwardly from the animal enclosure to allow waste outside of the enclosure to be swept through the slot into the gutter system. A method for forming the gutter system is disclosed and includes inversion casting of a material, such as concrete.

12 Claims, 6 Drawing Figures

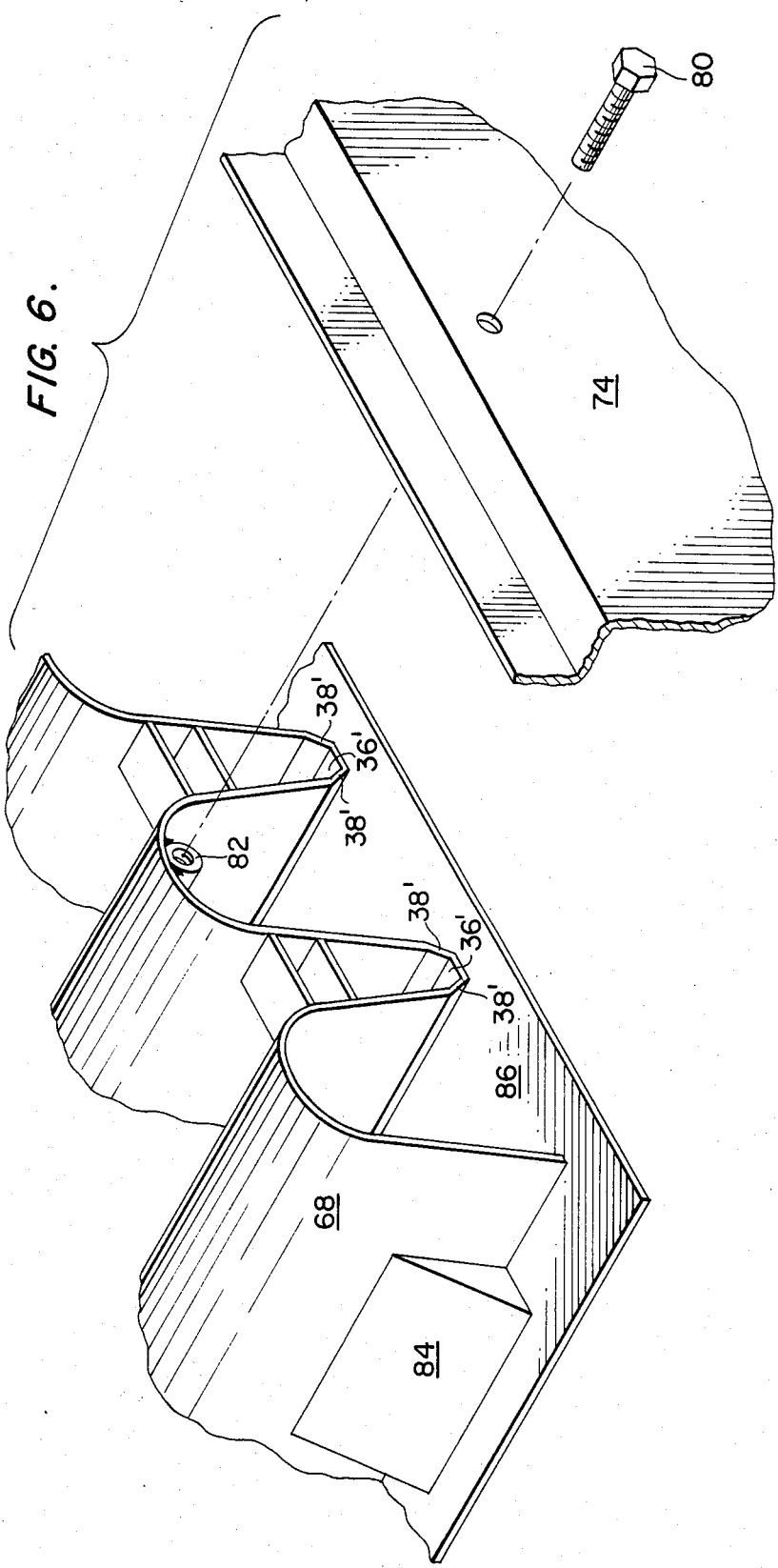

WASTE FLUSHING UNIT FOR HOG FARROWING

TECHNICAL FIELD

This invention relates to the art of gutter systems, particularly gutter systems employed in buildings used for raising animals.

BACKGROUND ART

It is known in the art of raising animals to provide a building enclosing the animals and having a gutter system for collecting waste from the animals. Prior art gutter systems take a variety of forms, but generally use a waste-permeable floor for supporting the animal and a gutter located beneath the floor to carry the waste to a central area for disposition.

U.S. Pat. No. 4,353,328 (Steidinger) shows a gutter system for a swine building which includes a plurality of pre-cast concrete gutters having farrowing crates mounted above the gutters. This system employs a single, wide gutter at one end of a farrowing crate and a single, narrow gutter at the opposite end of the farrowing crate. Adjacent rows of gutters are connected by pre-cast concrete walkways which rest on top of the gutter sections.

U.S. Pat. Nos. 3,224,414 (Conover), 3,584,603 (Rutherford); and 4,175,515 (Bradley) teach gutter systems for farm animals wherein a gutter is covered by a mesh for allowing waste material to fall through the mesh and into the gutter.

U.S. Pat. Nos. 4,183,324 (Nobbe) and 4,217,859 (Herring) show slotted floors which allow waste materials to fall into a gutter.

German Pat. No. 283,574 (Strache) shows a gutter section having a plurality of parallel channels. A gutter section may provide support for a series of spaced planks which serve as the floor of a building, or a gutter section may be arranged facing a similar section to provide a plurality of cylindrical pipe-like channels.

SUMMARY OF THE INVENTION

A major problem with all of the gutter systems known in the prior art is that installation is extremely expensive and time-consuming. These gutter systems are typically integral parts of a building and are quite large. It is therefore necessary to perform a substantial amount of excavation to install the gutter system below the level of the floor of the building. Many times the foundation of the building must be larger than otherwise required (in order to accomodate the gutter system), thus adding to the cost of the building.

Also, prior systems are not convenient to use since they provide primarily for carrying waste generated only within the confines of an animal enclosure and make no provision for waste which accumulates outside of that enclosure. Furthermore, the prior art systems have placed a mesh or slotted floor directly on a support wall, and this allows waste to accumulate between the upper edge of the support wall and the flooring. Removal of this waste requires additional time and effort.

In accordance with the invention, a gutter system includes a plurality of parallel channels formed in a pre-cast unit which is easily installed without excessive construction costs. The gutter system includes about seven parallel channels and has a width equal to the width of a typical hog farrowing enclosure. One end of the gutter unit has a tongue and the other end has a groove so that a plurality of units may be linearly aligned to form a continuous channel with a plurality of hog farrowing crates located side-by-side above the gutter system. The dividing walls of the gutter system have chamfered upper edges which lie in a common plane to support a mesh flooring. The chamfered edges minimize the accumulation of waste between the upper ends of the dividers and the mesh flooring, thus reducing the time and effort required to clean the system.

Also the outer walls of the unit have recessed portions which provide openings for sweeping waste which has accumulated outside of the farrowing unit into the gutter system.

Each unit is preferably made of pre-cast concrete and is self-supporting. The unit may thus be easily installed without an excess of care. The building is preferably prepared by excavating a predetermined area and constructing footings spaced by the distance between the outer edges of the unit. The unit is then simply placed in the excavated area on the footings, and backfill is put along the sides of the unit. Lifting holes in the sides of the unit are easily engaged for lifting it. The structure of the unit is sufficiently strong so that it may be lifted by a crane and placed in the excavated area. A plurality of these gutter systems is connected by joining the tongue of one unit with the groove of an adjacent unit and sealing the joint in a known manner.

After the units are installed and the backfill is in place, a sidewalk is poured between adjacent rows of the gutter systems to complete the floor of the building. Hog farrowing units are then placed on top of the gutter system, and the construction is complete.

In the presently preferred method of making each unit, a metal form is filled with concrete so that the unit is inverted with respect to its orientation when in use. This provides good contact between the steel form and the concrete when forming the individual gutter rows and results in a very smooth pathway. This smooth pathway minimizes the possibility of waste material catching on an irregularity in the surface.

Other materials, such as plastic, and/or fiberglass may be used for the unit.

It is an object of this invention to create a gutter system which is economical to install and provides for increased access to the gutter channels.

It is a further object of this invention to have a building for raising animals wherein an improved gutter system is provided for carrying waste from the animals.

BRIEF DESCRIPTION OF THE DRAWINGS

FIG. 6 is a partial view of the mold shown in FIG. 5.

DETAILED DESCRIPTION OF THE DRAWINGS

Figure 1:
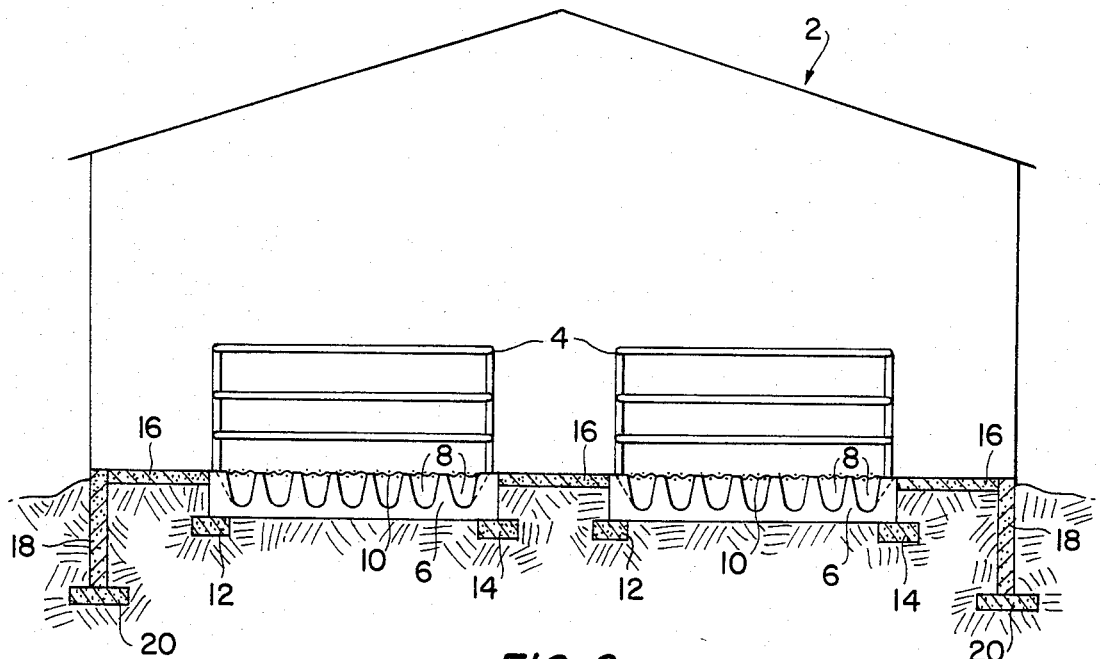
FIG. 1 is a cross section of a building including hog farrowing units and a gutter system in accordance with the invention.

With reference to FIG. 1, a building 2 is used for raising farm animals, for example, hogs. A plurality of farrowing crates 4 is located inside the building 2. These farrowing crates are known in the art and are used to contain individual hogs, and perhaps, a litter of pigs. Each farrowing crate 4 is supported by a gutter system 6 in accordance with the invention. The details of the inventive gutter system will be described in more detail below, but at this point it is only necessary to recognize that gutter system 6 includes a plurality of channels 8 for carrying waste. Flooring 10, which is preferably steel mesh, is supported by gutter system 6 so that the animal within the farrowing crate 4 is supported by the floor 10. The floor 10 is permeable to the animal's waste so that the waste falls through the floor 10 and into the channels 8 of the gutter system.

Each gutter system unit 6 is preferably supported by parallel footings 12 and 14, and the remainder of the lower portion of the gutter system unit 6 is surrounded by soil.

To provide a complete floor of the building 2, walkways 16 are poured on the soil adjacent the gutter systems 6, thus providing a concrete apron surrounding the farrowing crates 4. The upper surface of the walkway 16 is even with the upper surface of the gutter system 6 to facilitate sweeping waste material from the walkways 16 into the gutter system 6, as will be more fully described below.

Conventional foundation walls 18 and footings 20 for the building 2 are also shown.

Figure 2:
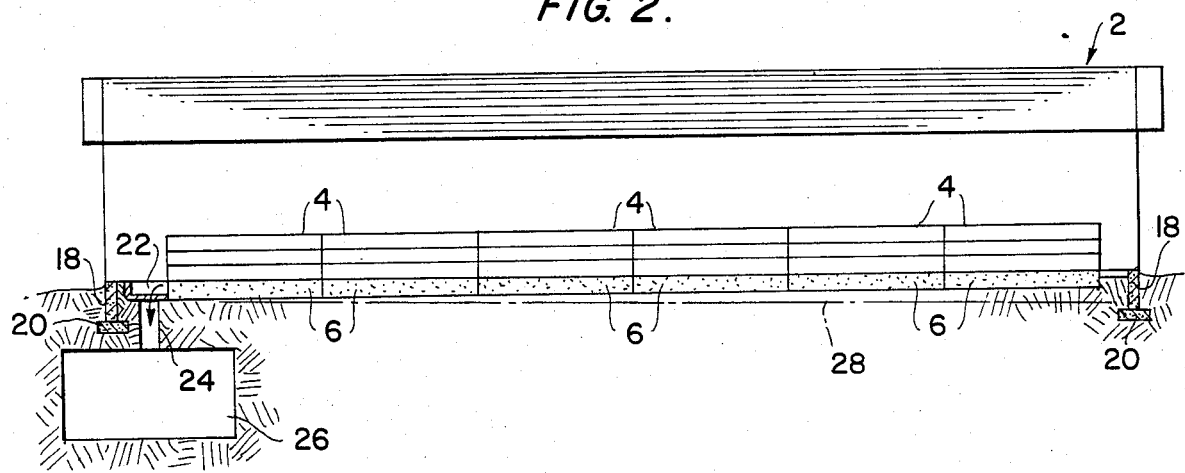
FIG. 2 is a longitudinal cross section of the building shown in FIG. 1.

FIG. 2 illustrates a longitudinal view of the building 2 wherein a plurality of gutter system units 6 is longitudinally aligned, and a number of farrowing crates 4 are located adjacent each other above the gutter system. A common trough 22 extends across the building at one end of the gutter system to collect the waste discharged from the low end of the gutter system. The waste from the trough 22 is discharged through a pipe 24 into a container 26 for eventual disposal. Dashed line 28 illustrates the horizontal, and it may thus be seen that one end of the gutter system is raised to provide a slope to cause waste to flow naturally through the channels 8 and into the trough 22.

Figure 3:
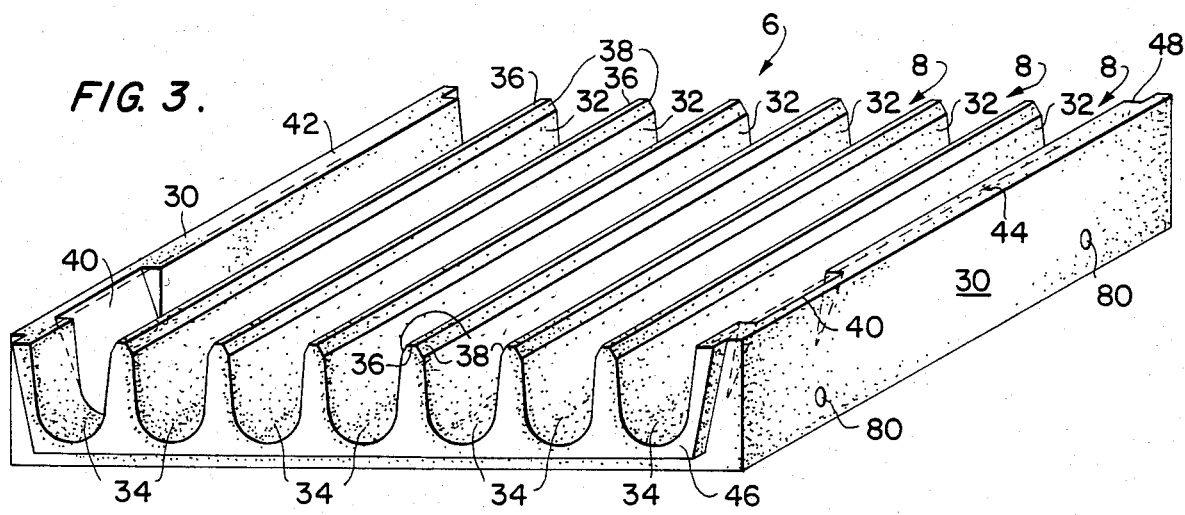
FIG. 3 is a perspective view of a single unit of the gutter system in accordance with the invention.

FIG. 3 shows an individual gutter system unit 6 in perspective. This unit is preferably of pre-cast concrete, but it should be understood that it may be of another material, such as plastic.

The gutter system 6 includes outer walls 30, which are preferably parallel, and a plurality of interior dividing walls 32. The channels 8 which carry the waste are formed between adjacent interior dividing walls 32 and the outer walls 30. Each channel 8 includes a curved bottom 34 which is integrally formed with and smoothly merges into an adjacent interior dividing wall 32 and outer wall 30.

The channels have smooth interior surfaces to minimize the possibility of waste catching on an irregularity in the surface. The casting method which will be described below produces this very smooth surface.

Each interior dividing wall 32 includes an upper end which is chamfered to minimize the amount of waste material retained between the mesh screen and the upper end of the dividing wall. Each end includes a somewhat flat portion 36 and slanted portions 38. Each of the flat portions 36 lies in a plane common to the other flat portions 36 and to the upper ends of the outer walls 30. This means that mesh flooring 10 may be placed on the unit 6 so that it extends between opposed outer walls 30 and is supported by each of the interior dividing walls 32 by contact with the flat portion 36. Provision of the slanted portions 38 allows each of the dividing walls to be thick enough to provide a sturdy structure and yet minimizes the area of contact between the floor and the wall to reduce the amount of waste material retained between the upper ends of the dividing walls and the floor. While the upper ends of the dividing walls preferably have substantially flat surfaces 36 and 38, these could be rounded if desired.

Each of the outer walls 30 includes a recessed portion, or slot 40, which may be used for sweeping waste material from the walkway 16 into a channel 8. The width of a gutter system unit 6 is preferably such that a standard farrowing crate 4 extends between phantom lines 42 and 44, as shown in FIG. 3. When this dimension is employed, the slot 40 will extend outwardly from the farrowing crate 4 to leave a small space for sweeping waste into a channel 8.

For example, a preferred dimension of the unit 6 shown in FIG. 3 is 5 feet in length and 7 feet 4 inches in width. The height is preferably 14 inches; thus only a small amount of soil need be excavated to install the inventive system. The interior dividing walls are preferably spaced by about one foot.

The units shown in FIG. 3 may be aligned and connected to each other by tongue 46 which cooperates with groove 8 in an adjacent unit. The joints are preferably sealed with asphalt rope sealant and a silicon caulk.

Figure 4:
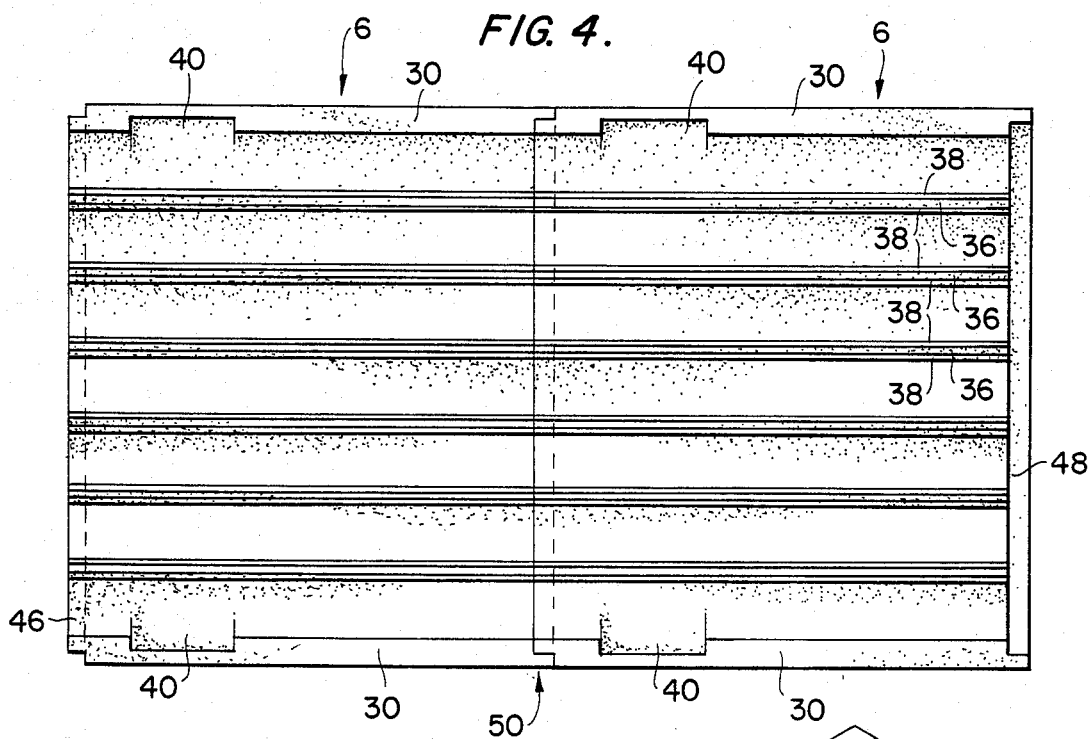
FIG. 4 is a top view of two aligned units in accordance with the invention.

FIG. 4 shows how adjacent units are connected, and the joint 50 illustrates a tongue 46 cooperating with a groove 48.

It will be appreciated that a novel gutter system has been described which is very efficient and easily installed. The unit preferably includes seven gutters for use with a seven-foot farrowing unit, thus allowing each gutter to carry a relatively small portion of the waste material. The waste naturally flows by the force of gravity into a holding tank for eventual disposal.

Figure 5:
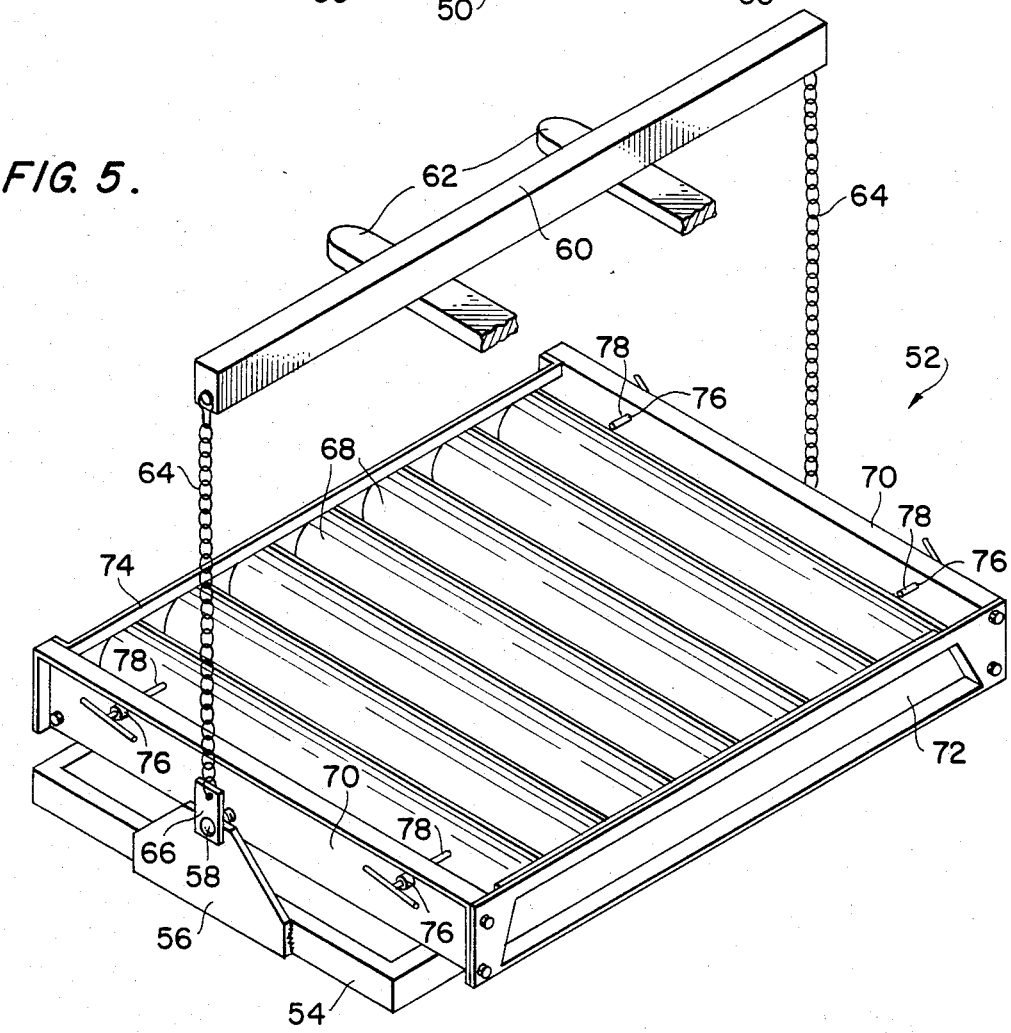
FIG. 5 is a perspective view of an apparatus for use in manufacturing a gutter unit in accordance with the invention.

With reference to FIGS. 5 and 6, the method of constructing the unit 6 will now be described.

FIG. 5 shows a mold 52 which is preferably used with concrete. It may be used with other kinds of materials, however. The mold is supported on a frame 54 and is secured to the frame, for example, by welding or bolting. Attached to each end of the frame 54 is a plate 56 having an axle 58 extending outwardly. The axle 58 is preferably located centrally of the frame so that a line connecting the axle 58 at one end of the frame with the axle at an opposite end of the frame lies in a vertical plane containing the center of gravity of the mold 52. The mold is supported by a cross beam 60 which is shown as being held by forks 62 (partially shown) of a forklift (not shown). Chains 64 extend downwardly from opposed ends of the cross beam 60 to bearing plates 66. Each of the bearing plates 66 has a hole therein for receiving the axle 58. This arrangement allows the mold to be rotated about the line connecting axles 58 so that concrete may be poured into the mold for inversion casting.

The mold includes curved elements 68 which form the interior dividing walls 32 and the curved bottoms 34 of the gutter system unit 6. Side plates 70 form the surfaces of the side walls 30. The connection between the curved element 68 and the side plates 70 forms the slots 40 and the upper edge of the sidewall 30.

A first end plate 72 is bolted to the curved element 68 and forms the groove 48. A second end plate 74 is bolted to an opposite end of the curved element 68 and has a portion which extends outwardly to form the tongue 46.

Each of the side plates 70 has apertures 76 for receiving rods 78. These rods produce holes 80 (see FIG. 3) in the gutter system unit 6 to provide a location for engaging the gutter system 6 with a lifting apparatus during installation.

FIG. 6 is an exploded view of the mold 52 showing how the second end plate 74 attaches to the curved elements 68. A bolt 80 passes through a hole in the second end plate 74 and engages a threaded nut 82 which is welded to the curved element 68.

FIG. 6 also shows a mold portion 84 which forms the slot 40 in the finished gutter system unit 6.

As will be seen from FIG. 6, the curved elements are attached to a bottom plate 86. When the curved element 68 engages the plate 86 surfaces 36' and 38' form surfaces 36 and 38 respectively on the completed product.

It will be appreciated that the curved element 68 shown in FIGS. 5 and 6 is the inverse of the gutter system unit 6 shown in FIG. 3 so that the mold 52 may be oiled and then filled with concrete and appropriate wire reinforcing elements. After the concrete has cured, the end plates 72 and 74 are removed, rods 78 are withdrawn, and the mold 52 is rotated about the axles 58 to release the gutter system unit 6.

Modifications of the invention within the scope of the following claims will be apparent to those of skill in the art.

It is clear that plastic and/or fiberglass materials can be used in place of concrete for all of the units referred to herein. The nature and types of plastics and fiberglass are well within the skill of those in the art. All references to concrete throughout the disclosures can thus be substituted by plastic and/or fiberglass.

What is claimed is:

1. Apparatus for carrying waste comprising a unitary structure having opposed side walls and a bottom extending between said side walls, at least one interior dividing wall between said side walls forming a plurality of generally parallel channels for carrying said waste, each of said interior dividing wall and said side walls having an upper surface which lies in a common plane, the upper end of said interior dividing wall being chamfered toward said upper surface to support a waste permeable floor and to trap a minimum amount of waste between the end of said interior dividing wall and said floor.

2. A method for forming the apparatus of claim 1 comprising the steps of providing a mold including a curved element having an outer surface in the shape of said interior divider wall and side plates attached to said curved element for forming said side walls, placing a moldable material in said mold so that said material engages said outer surface, and allowing said material to harden.

3. Apparatus according to claim 1 wherein an interior surface of at least one of said side walls forms a recess extending to said upper surface of said one of said side walls for allowing waste to be pushed through said recess into one of said channels.

4. Apparatus according to claim 3 in combination with enclosure means for confining an animal, said enclosure means being supported by said side walls and having outer walls located on said upper ends of said side walls so that at least a portion of said recess extends outwardly from said outer walls.

5. The combination of claim 4 further comprising said waste permeable floor for supporting said animal.

6. The combination of claim 5 wherein said side walls, bottom, and interior dividing walls are of pre-cast concrete.

7. The combination of claim 5 further comprising footing means having a surface engaging a lower surface of said bottom for supporting said side walls, bottom, and interior dividing walls.

8. The combination of claim 7 further comprising a building surrounding said enclosure.

9. A building for raising animals comprising an outer enclosure, footings in at least two substantially parallel rows within said outer enclosure and the apparatus recited in claim 1 supported by said footings.

10. The combination of claim 9 further comprising a farrowing crate supported by said apparatus and including a waste permeable floor.

11. Apparatus for carrying waste comprising opposed side walls forming a channel for carrying waste, at least one of said side walls having a surface facing said channel, said surface having a recessed portion therein for allowing material to pass into said channel, said recessed portion extending to an upper edge of said one of said side walls.

12. Apparatus according to claim 11 further comprising means for confining an animal supported by said side walls, said means for confining having an outer boundary located with respect to said recessed portion to allow material outside said means for confining to pass through said recessed portion into said channel.

* * * * *